(12) United States Patent
Chen et al.

(10) Patent No.: US 8,717,008 B2
(45) Date of Patent: May 6, 2014

(54) FAN SPEED TESTING SYSTEM

(75) Inventors: Xiang-Biao Chen, Shenzhen (CN); Li-Ping Fan, Shenzhen (CN); Yu-Lin Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 314 days.

(21) Appl. No.: 13/096,617

(22) Filed: Apr. 28, 2011

(65) Prior Publication Data
US 2012/0105053 A1 May 3, 2012

(30) Foreign Application Priority Data

Oct. 28, 2010 (CN) .......................... 2010 1 0523133

(51) Int. Cl.
- G01P 3/42 (2006.01)
- G01P 3/48 (2006.01)
- G01C 25/00 (2006.01)
- G01B 5/28 (2006.01)

(52) U.S. Cl.
USPC .............. 324/160; 324/166; 702/116; 702/38

(58) Field of Classification Search
USPC .......................................................... 324/160
See application file for complete search history.

(56) References Cited

U.S. PATENT DOCUMENTS

| 3,858,030 A | * | 12/1974 | Hart ............................ 235/30 R |
| 4,024,495 A | * | 5/1977 | O'Brien ........................ 340/449 |
| 4,093,853 A | * | 6/1978 | Hunt ......................... 250/231.14 |
| 4,777,368 A | * | 10/1988 | Kerlin, Jr. ................... 250/341.6 |
| 5,708,577 A | * | 1/1998 | Mckinley ........................ 363/89 |
| 5,727,928 A | * | 3/1998 | Brown ......................... 417/44.11 |
| 5,886,581 A | * | 3/1999 | Hugel et al. .................... 330/308 |
| 5,996,396 A | * | 12/1999 | Marshall et al. ............. 73/23.34 |
| 6,591,200 B1 | * | 7/2003 | Cohen et al. ..................... 702/38 |
| 6,616,505 B1 | * | 9/2003 | Reagan et al. ................ 446/467 |
| 6,618,128 B2 | * | 9/2003 | Van Voorhis et al. ........ 356/28.5 |
| 6,641,041 B2 | * | 11/2003 | Olds et al. ...................... 235/454 |
| 6,760,618 B1 | * | 7/2004 | Inoue ............................... 604/20 |
| 6,774,610 B2 | * | 8/2004 | Orozco .......................... 323/235 |
| 7,204,952 B1 | * | 4/2007 | Poor et al. ........................ 266/81 |

(Continued)

FOREIGN PATENT DOCUMENTS

EP 874190 A1 * 10/1998 ................ F21V 8/00

OTHER PUBLICATIONS

Webpage Citation to http://www.ustudy.in/node/7519 Copyright © 2008 Lakshmi Anand K, Director of MSPVL Polytechnic College, Pavoorchatram.*

Primary Examiner — Patrick J Assouad
Assistant Examiner — Christopher McAndrew
(74) Attorney, Agent, or Firm — Novak Druce Connolly Bove + Quigg LLP

(57) ABSTRACT

A fan speed testing system includes a voltage regulating module, a rotational frequency collecting module, and a rotational frequency converting module. The voltage regulating module receives an AC voltage signal and converts the AC voltage signal to a variable first DC voltage signal to adjust a rotational speed of a fan. The rotational frequency collecting module detects the rotational speed of the fan and outputs rotational frequency signals. The rotational frequency converting module receives the rotational frequency signals and determines the rotational speed of the fan according to numbers and period of time level voltage switching in the rotational frequency signals.

16 Claims, 5 Drawing Sheets

(56) References Cited

U.S. PATENT DOCUMENTS

| | | | |
|---|---|---|---|
| 7,321,948 B1 * | 1/2008 | Sullivan et al. | 710/305 |
| 7,415,945 B2 * | 8/2008 | Tuttle | 123/41.11 |
| 7,573,251 B2 * | 8/2009 | Yang et al. | 323/303 |
| 7,728,581 B2 * | 6/2010 | Chen et al. | 324/166 |
| 7,877,638 B2 * | 1/2011 | Fan et al. | 714/32 |
| 8,060,332 B2 * | 11/2011 | Chen | 702/116 |
| 8,164,324 B2 * | 4/2012 | Hara et al. | 324/166 |
| 2007/0297061 A1 * | 12/2007 | Kyomoto et al. | 359/618 |
| 2008/0303513 A1 * | 12/2008 | Turner | 324/160 |
| 2010/0181992 A1 * | 7/2010 | Hino et al. | 324/175 |

* cited by examiner

FAN SPEED TESTING SYSTEM

BACKGROUND

1. Technical Field

The present disclosure relates to testing systems, especially to a testing system for testing fan speed.

2. Description of Related Art

After computers are manufactured, quality tests are required. One of the tests is to test the speed of the fans of the computers. A conventional method to test the speed of the fans is by using a tachometer. However, the conventional method requires opening the computer and manually positioning the tachometer close to the fan, which wastes time and labor, and as well, the tachometer is expensive.

Therefore there is a need for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
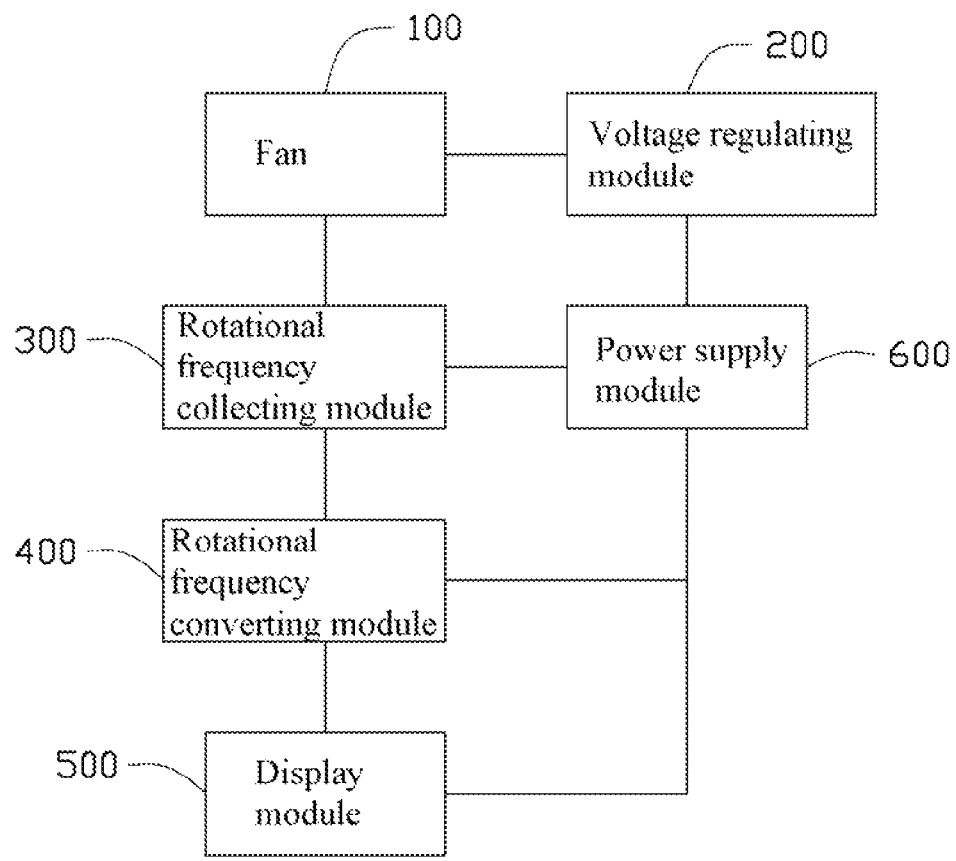
FIG. 1 is a block view of a fan speed testing system in accordance with an embodiment.

Referring to FIG. 1, a fan speed testing system for testing a fan 100 includes a voltage regulating module 200, a rotational frequency collecting module 300, a rotational frequency converting module 400, a display module 500, and a power supply module 600. The voltage regulating module 200 receives a 220V AC voltage signal and converts the AC voltage signal to a variable first DC voltage signal to adjust a rotational speed of the fan 100. The rotational frequency collecting module 300 detects the rotational speed of the fan 100 and outputs rotational frequency signals. The rotational frequency converting module 400 receives the rotational frequency signals and determines the rotational speed of the fan 100 according to numbers and period of time level of voltage switching in the rotational frequency signals. The display module 500 receives and displays the rotational speed of the fan 100. The power supply module 600 provides power to the rotational frequency collecting module 300, the rotational frequency converting module 400, and the display module 500.

Figure 2:
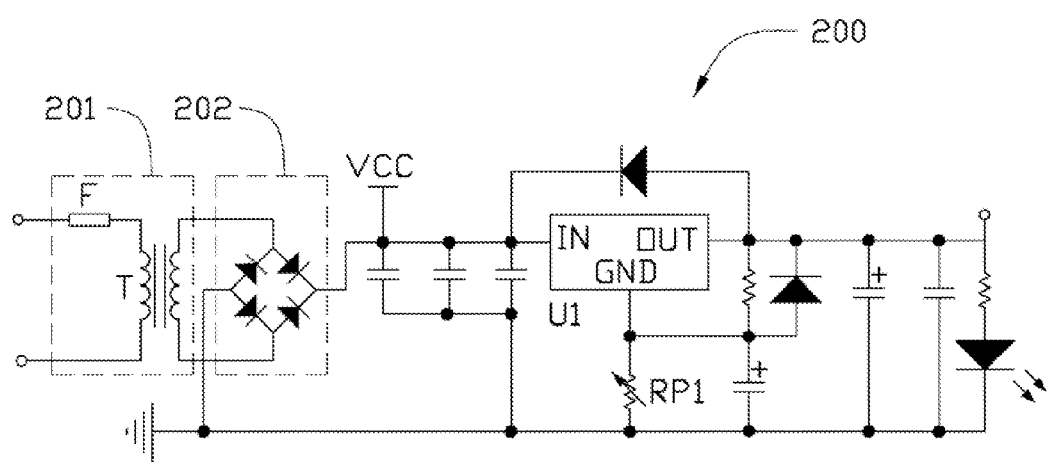
FIG. 2 is a circuit view of a voltage regulating module of FIG. 1.

Referring to FIG. 2, the voltage regulating module 200 includes a voltage decreasing circuit 201, a rectification circuit 202, a first voltage regulating chip U1, and a first variable resistor RP1. The voltage decreasing circuit 201 includes a fuse F, and a transformer T. The rectification circuit 202 includes four diodes electrically connected together end to end. The first voltage regulating chip U1 includes a first voltage regulating chip input terminal, a first voltage regulating chip output terminal, and a first voltage regulating chip ground terminal. The voltage decreasing circuit 201 receives the 220V AC voltage signal and converts the 220V AC voltage signal to a 12V AC voltage signal. The rectification circuit 202 receives the 12V AC voltage signal and converts the 12V AC voltage signal to a +17V DC voltage signal. The first voltage regulating chip U1 receives the +17V DC voltage signal at the first voltage regulating chip input terminal and outputs the variable first DC voltage signal at the first voltage regulating chip output terminal. The first voltage regulating chip U1 ground terminal is grounded via the first variable resistor RP1. In one embodiment, a resistance adjusting scope of the first variable resistor RP1 is from +1.25V to +12.5V.

Figure 3:
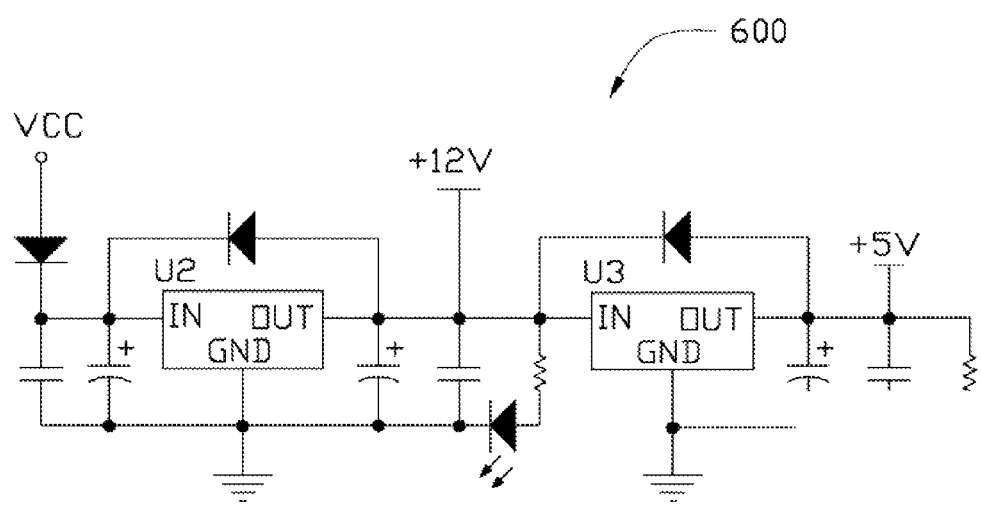
FIG. 3 is a circuit view of a power supply module of FIG. 1.

Referring to FIG. 3, the power supply module 600 includes a second voltage regulating chip U2 and a third voltage regulating chip U3. The second voltage regulating chip U2 includes a second voltage regulating chip input terminal, a second voltage regulating chip output terminal, and a second voltage regulating chip ground terminal. The third voltage regulating chip U3 includes a third voltage regulating chip input terminal, a third voltage regulating chip output terminal, and a third voltage regulating chip ground terminal. The second voltage regulating chip U2 receives the +17V DC voltage signal at the second voltage regulating chip input terminal and outputs a +12V DC voltage signal at the second voltage regulating chip output terminal. The third voltage regulating chip U3 receives the +12V DC voltage signal at the third voltage regulating chip input terminal and outputs a +5V DC voltage signal at the third voltage regulating chip output terminal. In one embodiment, the +12V DC voltage signal is provided to the rotational frequency collecting module 300. The +5V DC voltage signal is provided to the rotational frequency converting module 400, and the display module 500.

Figure 4:
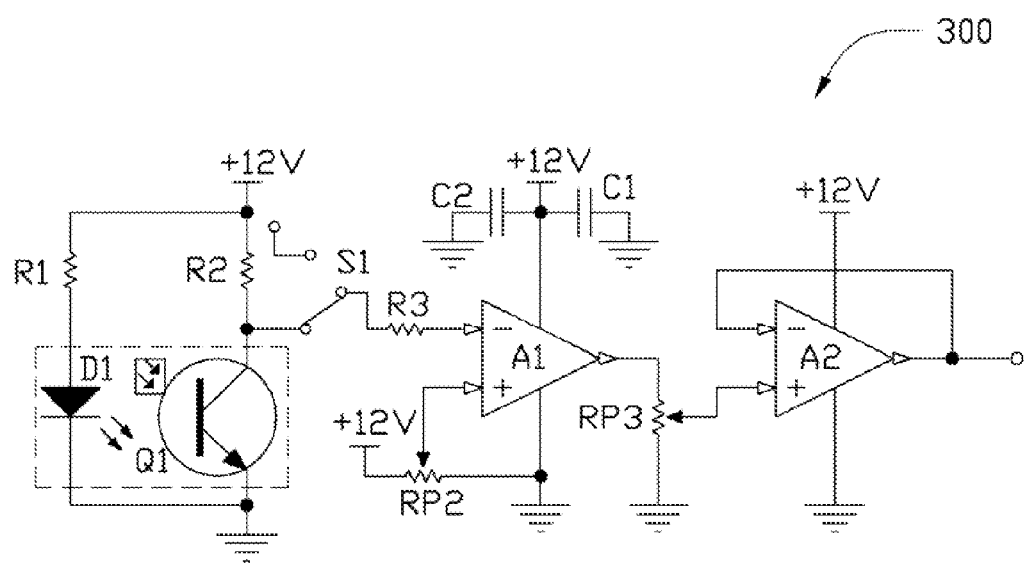
FIG. 4 is a circuit view of a rotational frequency collecting module of FIG. 1.

Referring to FIG. 4, the rotational frequency collecting module 300 includes a reflecting infrared sensor 301, a single-pole double-throw (SPDT) S1, and a wave processing circuit 302. The wave processing circuit 302 includes a first comparator A1 and a second comparator A2. The reflecting infrared sensor 301 includes a first LED D1 and a phototransistor Q1. The SPDT S1 includes a SPDT first terminal, a SPDT second terminal, and a SPDT third terminal. The first comparator A1 includes a first comparator non-inverting input terminal, a first comparator inverting input terminal, a first comparator power terminal, and a first comparator output terminal. The second comparator A2 includes a second comparator non-inverting input terminal, a second comparator inverting input terminal, a second comparator power terminal, and a second comparator output terminal. The first LED D1 includes a first LED anode and a first LED cathode. The phototransistor Q1 includes a phototransistor emitter and a phototransistor collector. The fan 100 includes a fan feedback terminal. The first LED anode receives the +12V DC voltage signal via a resistor R1. The first LED cathode is grounded. The phototransistor collector receives the +12V DC voltage signal via a resistor R2. The phototransistor emitter is grounded. The SPDT first terminal is electrically connected to the phototransistor collector for receiving the rotational frequency signals. The SPDT second terminal is electrically connected to the fan feedback terminal for receiving rotational speed control signals. The SPDT third terminal is electrically connected to the first comparator inverting input terminal via a resistor R3. The first comparator non-inverting input terminal receives the +12V DC voltage signal via a second variable resistor RP2. The first comparator power terminal receives the +12V DC voltage signal. The first comparator power terminal is grounded via capacitor C1 and is grounded via capacitor C2. The first comparator output terminal is grounded via a third variable resistor RP3. The third variable resistor RP3 includes a third variable resistor adjusting terminal. The second comparator non-inverting input terminal is electrically connected to the third variable resistor RP3 adjusting terminal. The second comparator inverting input terminal is electrically connected to the second comparator output terminal. The second comparator power terminal receives the +12V DC voltage signal. The second comparator output terminal outputs rectified rotational frequency signals and rotational speed control signals.

Figure 5:
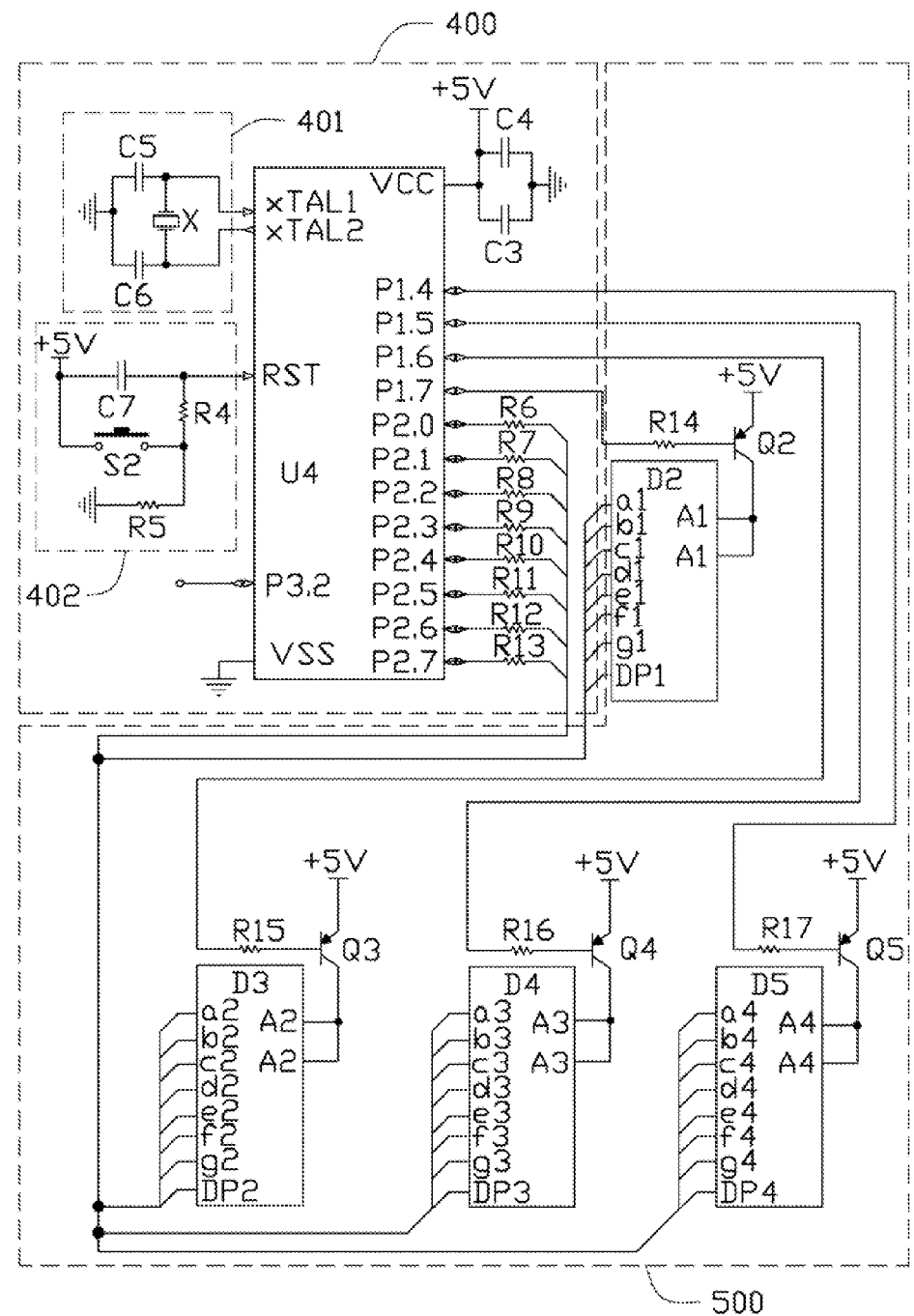
FIG. 5 is a circuit view of a rotational frequency converting module and a speed displaying module of FIG. 1.

Referring to FIG. 5, the rotational frequency converting module 400 includes a micro controller U4. The micro controller U4 receives the rectified rotational frequency signals and rotational speed control signals and determines the rotational speed of the fan 100 according to the rectified rotational frequency signals and rotational speed control signals. The micro controller U4 includes a micro controller power pin VCC, a micro controller first clock pin XTAL1, a micro controller second clock pin XTAL2, a micro controller resetting pin RST, a plurality of micro controller data pins P1.4-1.7, P2.0-P2.7, and a micro controller rotational signal collecting pin P3.2. The display module 500 is electrically connected to the micro controller U4 for displaying the rotational speed of the fan 100. The micro controller power pin VCC is electrically connected to receive the +5V DC voltage signal. The micro controller power pin VCC is grounded via two capacitors C3, C4 connected in parallel. The micro controller first clock pin XTAL1 and the micro controller second clock pin XTAL2 are electrically connected to a clock circuit 401. The clock circuit 401 includes a crystal oscillator X and two capacitors C5, C6. The crystal oscillator X is electrically connected between the micro controller first clock pin XTAL1 and the micro controller second clock pin XTAL2. The capacitor C5 is electrically connected between the crystal oscillator X and ground. The capacitor C6 is electrically connected between the crystal oscillator X and ground. The micro controller resetting pin RST is electrically connected to the reset control circuit 402. The reset control circuit 402 includes a reset switch S2. The micro controller resetting pin RST is electrically connected to receive the +5V DC voltage signal via the capacitor C7. The micro controller resetting pin RST is electrically connected to receive the +5V DC voltage signal via the resistor R4 and the reset switch S2 connected in series. The micro controller resetting pin RST is grounded via the resistors R4, R5 connected in series.

The micro controller data pins P2.0-P2.7 are electrically connected to the display module 500. The display module 500 includes a second LED D2, a third LED D3, a fourth LED D4, and a fifth LED D5 for displaying the rotational speed of the fan 100. The second LED D2 includes a plurality of second LED data pins a1-g1, DP1 and a second LED power pin A1. The third LED D3 includes a plurality of third LED data pins a2-g2, DP2 and a third LED power pin A2. The fourth LED D4 includes a plurality of fourth LED data pins a3-g3, DP3 and a fourth LED power pin A3. The fifth LED D5 includes a plurality of fifth LED data pins a4-g4, DP4 and a fifth LED power pin A4. The plurality of second LED data pins a1-g1, DP1, the plurality of third LED data pins a2-g2, DP2, the plurality of fourth LED data pins a3-g3, DP3, and the plurality of fifth LED data pins a4-g4, DP4 are electrically connected together to the micro controller data pins P2.0-P2.7 via the resistors R6-R13. The second LED power pin A1 is electrically connected to receive the +5V DC voltage signal via a first transistor Q2. The third LED power pin A2 is electrically connected to receive the +5V DC voltage signal via a second transistor Q3. The fourth LED power pin A3 is electrically connected to receive the +5V DC voltage signal via a third transistor Q4. The fifth LED power pin A4 is electrically connected to receive the +5V DC voltage signal via a fourth transistor Q5. The first transistor Q2 includes a first transistor base. The second transistor Q3 includes a second transistor base. The third transistor Q4 includes a third transistor base. The fourth transistor Q5 includes a fourth transistor base. The fourth transistor Q5 base is electrically connected to the micro controller data pin P1.4 via the resistor R17. The third transistor Q4 base is electrically connected to micro controller data pin P1.5 via the resistor R16. The second transistor Q3 base is electrically connected to the micro controller data pin P1.6 via the resistor R15. The first transistor Q2 base is electrically connected to the micro controller data pin P1.7 via the resistor R14. The micro controller rotational signal collecting pin P3.2 is electrically connected to the second comparator output terminal for receiving the rectified rotational frequency signals and rotational speed control signals from the rotational frequency collecting module 300.

Referring to FIGS. 1 to 5, the working principle of the fan speed testing system is described below. Two labels with an identifiable color are attached on a vane or blade of the fan 100. In one embodiment, the labels are white strips and the fan 100 is black. When the fan speed testing system is operational, light from the LED D1 reflects off the labels and enables the phototransistor Q1 to be turned on. At this time, the phototransistor Q1 is in a first state. The phototransistor Q1 is turned off if light from the LED D1 reflects off the other parts of the fan 100. At this time, the phototransistor Q1 is in a second state. The labels rotate when the vane or blade of the fan 100 rotates, thereby the phototransistor Q1 is turned on intermittently. The reflecting infrared sensor 301 produces a pulse signal. The pulse signal is amplified and is adjusted by the comparators A1, A2 to be a standard square wave. The square wave is delivered to the micro controller rotational signal collecting pin P3.2. The micro controller U4 collects conversion times when a level voltage falls from high level voltage to low level voltage in the square wave, which means the fan 100 rotates one time. The micro controller U4 can calculate the rotational speed of the fan 100 during a given period of time. The micro controller U4 delivers the rotational speed of the fan 100 to the second LED D2, the third LED D3, the fourth LED D4, and the fifth LED D5. The second LED D2, the third LED D3, the fourth LED D4, and the fifth LED D5 display the rotational speed of the fan 100.

The SPDT S is pushed to electrically connect the SPDT first terminal and the SPDT third terminal together. The micro controller rotational signal collecting pin P3.2 receives the rotational frequency signals from the rotational frequency collecting module 300. In one embodiment, the micro controller U4 calculates the rotational speed of the fan 100 during 1.5 seconds. If the fan 100 rotates n times, the rotational speed of the fan 100 can be calculated according to: $60 \div 1.5 \times n \div 2 = 20n$ revolutions per minute (rpm). The SPDT S is pushed to electrically connect the SPDT first terminal and the SPDT second terminal together. The micro controller rotational signal collecting pin P3.2 receives the rotational speed control signals from the rotational frequency collecting module 300. If a frequency of the rotational speed control signals is f, the rotational speed of the fan 100 can be calculated according to: 60×f÷2=30f rpm. In one embodiment, the variable first DC voltage signal is adjustable by adjusting the resistance of the first variable resistor RP1. According to a test result, the rotational speed 20n of the fan 100 should be equal to 30f.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan speed testing system comprising:
   a voltage regulating module configured to receive an AC voltage signal and convert the AC voltage signal to a variable first DC voltage signal to adjust a rotational speed of a fan;
   a rotational frequency collecting module configured to detect the rotational speed of the fan and output rotational frequency signals; wherein the rotational frequency collecting module comprises a reflecting infrared sensor; the reflecting infrared sensor comprises a light emitting diode (LED) and a phototransistor; and
   a rotational frequency converting module configured to receive the rotational frequency signals and determine the rotational speed of the fan according to numbers and period of time level voltage switching in the rotational frequency signals; wherein two labels with an identifiable color are attached on a blade of the fan; and when the fan speed testing system is operational, light from the LED is configured to reflect off the two labels, and the light reflecting off the two labels is configured to turn on the phototransistor.

2. The fan speed testing system of claim 1, wherein the voltage regulating module comprises a voltage decreasing circuit, a rectification circuit, a first voltage regulating chip, and a variable resistor; the first voltage regulating chip comprises a first voltage regulating chip input terminal, a first voltage regulating chip output terminal, and a first voltage regulating chip ground terminal; the voltage decreasing circuit is configured to receive the AC voltage signal and convert the AC voltage signal to a decreased AC voltage signal; the rectification circuit is configured to receive the decreased AC voltage signal and convert the decreased AC voltage signal to a second DC voltage signal; the first voltage regulating chip is configured to receive the second DC voltage signal at the first voltage regulating chip input terminal and output the variable first DC voltage signal at the first voltage regulating chip output terminal; and the first voltage regulating chip ground terminal is grounded via the variable resistor.

3. The fan speed testing system of claim 2, further comprising a power supply module; the power supply module is configured to receive the second DC voltage signal and output a third DC voltage signal and a fourth DC voltage signal, to provide power to the rotational frequency collecting module and the rotational frequency converting module.

4. The fan speed testing system of claim 3, wherein the power supply module comprises a second voltage regulating chip and a third voltage regulating chip; the second voltage regulating chip comprises a second voltage regulating chip input terminal, a second voltage regulating chip output terminal, and a second voltage regulating chip ground terminal; the third voltage regulating chip comprises a third voltage regulating chip input terminal, a third voltage regulating chip output terminal, and a third voltage regulating chip ground terminal; the second voltage regulating chip is configured to receive the second DC voltage signal at the second voltage regulating chip input terminal and output the third DC voltage signal at the second voltage regulating chip output terminal; the third voltage regulating chip is configured to receive the third DC voltage signal at the third voltage regulating chip input terminal and output the fourth DC voltage signal at the third voltage regulating chip output terminal.

5. The fan speed testing system of claim 1, wherein the rotational frequency collecting module further comprises a single-pole double-throw (SPDT) and a wave processing circuit; the SPDT comprises a SPDT first terminal, a SPDT second terminal, and a SPDT third terminal; the LED comprises an LED anode and an LED cathode; the phototransistor comprises a phototransistor emitter and a phototransistor collector; the LED anode is configured to receive the third DC voltage signal; the LED cathode is grounded; the phototransistor collector is configured to receive the third DC voltage signal via a resistor; and the phototransistor emitter is grounded.

6. The fan speed testing system of claim 5, wherein the fan comprises a fan feedback terminal; the SPDT first terminal is electrically connected to the phototransistor collector for receiving the rotational frequency signals; the SPDT second terminal is electrically connected to the fan feedback terminal for receiving rotational speed control signals; the SPDT third terminal is electrically connected to the wave processing circuit; the wave processing circuit is configured to output rectified rotational frequency signals and the rotational speed control signals.

7. The fan speed testing system of claim 1, wherein the phototransistor is turned off if light from the LED does not reflect off of the two labels on the fan.

8. The fan speed testing system of claim 6, wherein the rotational frequency converting module comprises a micro controller; the micro controller is configured to receive the rectified rotational frequency signals and the rotational speed control signals and determine the rotational speed of the fan according to the rectified rotational frequency signals and the rotational speed control signals.

9. The fan speed testing system of claim 8, further comprising a display module electrically connected to the micro controller; and the display module is configured to display the rotational speed of the fan.

10. A fan speed testing system, comprising:
    a voltage regulating module configured to receive an AC voltage signal and convert the AC voltage signal to a variable first DC voltage signal to adjust a rotational speed of a fan; wherein two labels with an identifiable color are attached on a blade of the fan;
    a rotational frequency collecting module configured to detect the rotational speed of the fan and output rotational frequency signals; wherein the rotational frequency collecting module comprises a reflecting infrared sensor, a single-pole double-throw (SPDT), and a wave processing circuit; the reflecting infrared sensor is configured to receive light reflected off of the two labels and produce a pulse signal; the reflecting infrared sensor comprises a light emitting diode (LED) and a phototransistor; and when the fan speed testing system is operational, light from the LED is configured to reflect off the two labels, and the light reflecting off the two labels is configured to turn on the phototransistor; the SPDT comprises a SPDT first terminal, a SPDT second terminal, and a SPDT third terminal; the LED comprises an LED anode and an LED cathode; the phototransistor comprises a phototransistor emitter and a phototransistor collector; the LED anode is configured to receive a third DC voltage signal; the LED cathode is grounded; the phototransistor collector is configured to receive the third DC voltage signal via a resistor; and the phototransistor emitter is grounded; the fan comprises a fan feedback terminal; the SPDT first terminal is electrically connected to the phototransistor collector for receiving the rotational frequency signals; the SPDT second terminal is electrically connected to the fan feedback terminal for receiving rotational speed control signals; the SPDT third terminal is electrically connected to the wave processing circuit; the wave processing circuit is configured to output rectified rotational frequency signals and the rotational speed control signals; and a rotational frequency converting module configured to receive the rectified rotational frequency signals and the rotational speed control signals and determine the rotational speed of the fan according to numbers and period of time level voltage switching in the rotational frequency signals.

11. The fan speed testing system of claim 10, wherein the voltage regulating module comprises a voltage decreasing circuit, a rectification circuit, a first voltage regulating chip, and a variable resistor; the first voltage regulating chip comprises a first voltage regulating chip input terminal, a first voltage regulating chip output terminal, and a first voltage regulating chip ground terminal; the voltage decreasing circuit is configured to receive the AC voltage signal and convert the AC voltage signal to a decreased AC voltage signal; the rectification circuit is configured to receive the decreased AC voltage signal and convert the decreased AC voltage signal to a second DC voltage signal; the first voltage regulating chip is configured to receive the second DC voltage signal at the first voltage regulating chip input terminal and output the variable first DC voltage signal at the first voltage regulating chip output terminal; and the first voltage regulating chip ground terminal is grounded via the variable resistor.

12. The fan speed testing system of claim 11, further comprising a power supply module; the power supply module is configured to receive the second DC voltage signal and output the third DC voltage signal and a fourth DC voltage signal to provide power to the rotational frequency collecting module and the rotational frequency converting module.

13. The fan speed testing system of claim 12, wherein the power supply module comprises a second voltage regulating chip and a third voltage regulating chip; the second voltage regulating chip comprises a second voltage regulating chip input terminal, a second voltage regulating chip output terminal, and a second voltage regulating chip ground terminal; the third voltage regulating chip comprises a third voltage regulating chip input terminal, a third voltage regulating chip output terminal, and a third voltage regulating chip ground terminal; the second voltage regulating chip is configured to receive the second DC voltage signal at the second voltage regulating chip input terminal and output the third DC voltage signal at the second voltage regulating chip output terminal; the third voltage regulating chip is configured to receive the third DC voltage signal at the third voltage regulating chip input terminal and output the fourth DC voltage signal at the third voltage regulating chip output terminal.

14. The fan speed testing system of claim 10, wherein the phototransistor is turned off if light from the LED does not reflect off of the two labels on the fan.

15. The fan speed testing system of claim 10, wherein the rotational frequency converting module comprises a micro controller; the micro controller is configured to receive the rectified rotational frequency signals and the rotational speed control signals and determine the rotational speed of the fan according to the rectified rotational frequency signals and the rotational speed control signals.

16. The fan speed testing system of claim 15, further comprising a display module electrically connected to the micro controller; and the display module is configured to display the rotational speed of the fan.

\* \* \* \* \*